April 22, 1941.  V. HAMMAR  2,239,558
CONVEYER FOR GUNS
Filed Dec. 5, 1938  2 Sheets-Sheet 2
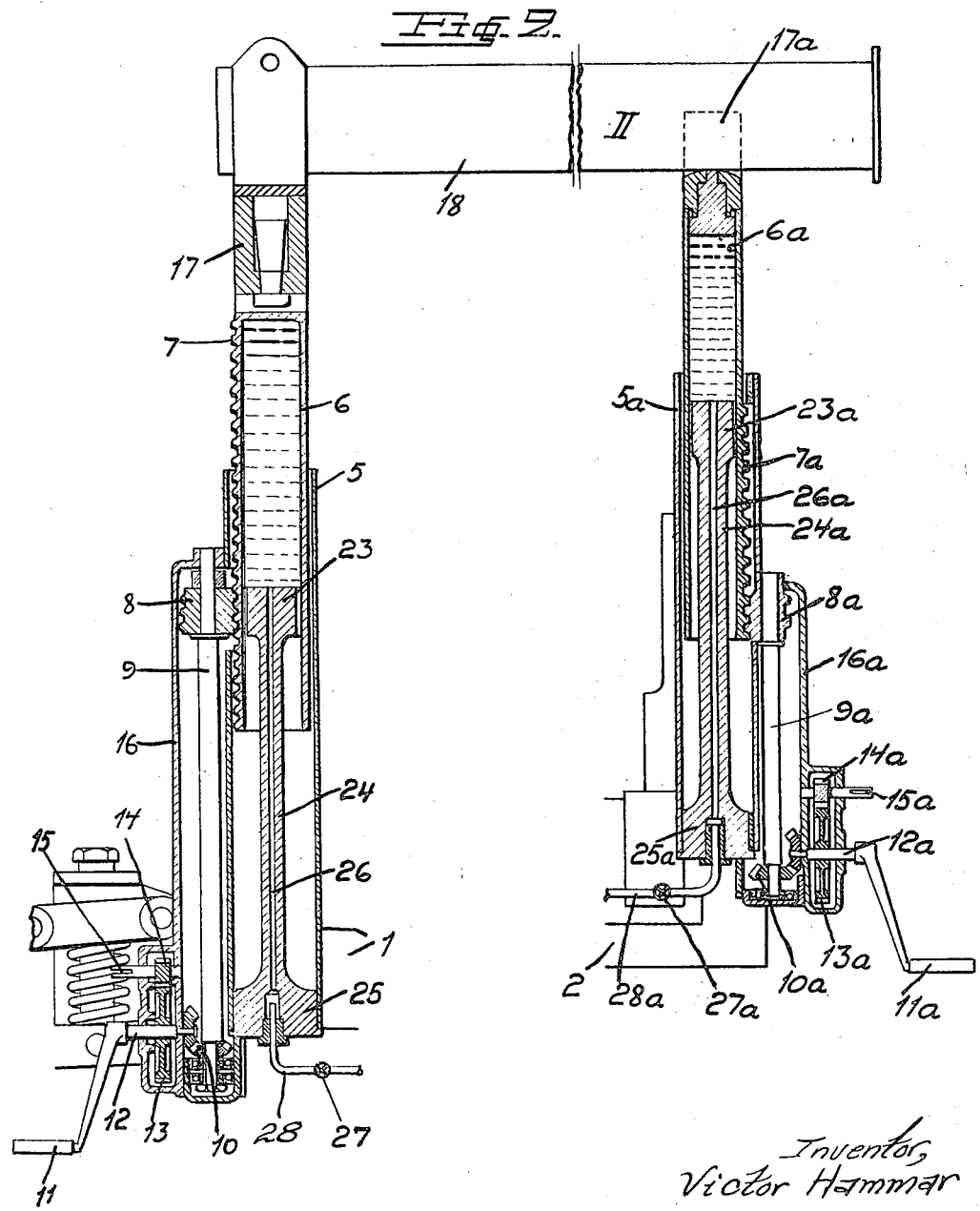
Inventor,
Victor Hammar Patented Apr. 22, 1941

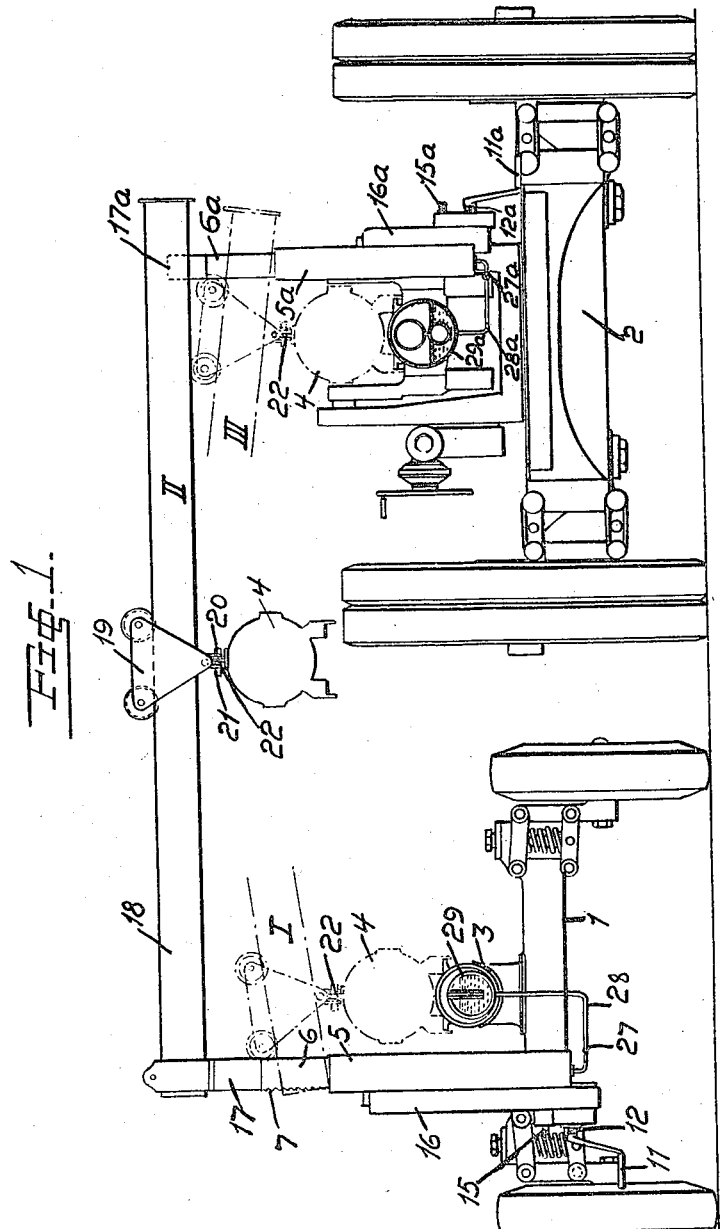

2,239,558

UNITED STATES PATENT OFFICE 2,239,558

CONVEYER FOR GUNS

Victor Hammar, Bofors, Sweden, assignor to Aktiebolaget Bofors, Bofors, Sweden

Application December 5, 1938, Serial No. 244,113
In Sweden March 26, 1938

12 Claims. (Cl. 89—40)

The present invention relates to means for transferring gun barrels from one vehicle to another.

For the transport of heavy guns it is usual to transfer the barrel from the gun carriage to a separate transport carriage, the barrel being retransferred to the gun carriage when the gun is to be used.

It is important that it should be possible to effect these transfers quickly and easily by hand.

The invention has for its object to make this feasible, and the invention essentially consists in this that on the transport carriage and on the gun carriage are provided lifting means operable by hand and that between these lifting means can be placed a beam on which is displaceably movable a traveller for the transfer of the barrel. The lifting means are preferably adapted to be acted on by a driving fluid medium, for example compressed air or by compression or tension springs, in order to balance the weight of the barrel and preferably also the weight of those parts of the conveyer mechanism, which are raised and lowered.

The accompanying drawings illustrate an embodiment of a conveyer, according to the invention. Figure 1 shows the lifting means and the appertaining parts in elevation and the transport carriage and the gun carriage viewed from the rear. Fig. 2 is a sectional view of the hoist and balancing mechanism.

The transport carriage is denoted by 1 and comprises a four-wheeled vehicle of a construction known per se with independent springing and steering wheels. The gun carriage which also may be of a construction known per se is denoted by 2.

The lifting means provided on the transport and the gun carriages are of the same construction and in the following therefore only the lifting means on the transport carriage are described in detail. The corresponding parts of the lifting means on the gun carriage are denoted by the same reference numerals as for the transport carriage but with the index reference *a* added.

The transport carriage is provided with a bed 3 for the barrel 4, said bed extending longitudinally across the carriage and in the construction shown consisting of a large tube. To the transport carriage is fixed an upright or post 5 in the form of a tube, in which a cylinder 6 is slidably arranged. At one side of the cylinder is a rack 7 with which engages a worm wheel 8, the shaft 9 of which at its lower end by means of a conical gear 10 is connected to a shaft 12 provided with a crank 11. On this shaft is also mounted the larger gear wheel 13 of a cylindrical reduction gear, the smaller wheel 14 of which is mounted on a second, upper shaft 15. All the gears 8, 10, 13, 14 are disposed in a housing 16 secured to the upright 5. On the top of the cylinder 6 is turnably mounted a fork 17 in which is swingably mounted a conveyer beam 18, the other end of which, as shown in the drawings, can be placed in a fork 17a, affixed to the upper end of the lifting cylinder 6a on the gun carriage. On this beam runs a traveller 19, which by means of a shackle 20 and a bolt 21 may be connected to the lifting eye 22 of the barrel.

By turning the crank 11 (respectively 11a) in one or the other direction and by means of the conical gear 10 (respectively 10a) and the worm gear 8, 7 (respectively 8a, 7a) the cylinder 6 (respectively 6a) with the parts carried thereby may be raised or lowered.

In order to balance the weight of these parts and that of the barrel 4 the following means are provided.

The lifting cylinder 6 (respectively 6a) closely surrounds a piston 23 (respectively 23a) which by means of a rod 24 (respectively 24a) and a plug 25 (respectively 25a) is affixed to the upright 5 (respectively 5a). The piston and the rod as well as the plug are bored through at 26 (respectively 26a) and through this bore and a conduit 28 (respectively 28a) provided with a stop cock 27 (respectively 27a) the cylinder space above the piston may be connected with a hydro-pneumatic cylinder 29 disposed in the tube-shaped bed 3 of the transport carriage (respectively the hydro-pneumatic barrel-return cylinder 29a) said cylinders being filled with liquid and compressed air.

The transfer of the barrel 4 from the transport carriage 1 to the gun carriage 2 is effected in the following way.

The transport carriage is placed alongside the gun carriage at a suitable distance therefrom and so that the uprights 5 and 5a are opposite each other. The conveyer beam 18, which during the transport is swung back along the barrel resting on the transport carriage and secured to this by suitable means, is swung out towards the gun carriage and the free end thereof is placed in the fork 17a. The traveller 19 is placed above the barrel (position I in Fig. 1) and by means of the bolt 21 the lifting eye 22 of the barrel is connected with the shackle 20 of the traveller. This connection is easily effected as the shackle of the traveller since the previous transfer of the barrel from the gun carriage to the transport carriage already is at the correct height. If the shackle 20 and the lifting eye 22, in consequence of uneven ground conditions, are not on a level with each other, the necessary adjustment can be effected by means of the crank 11 of the lifting means. Then the lower end of the beam 18 is lifted by means of the crank 11, until the beam is in a horizontal position (position II in Fig. 1). The raising of the cylinder 6 is facilitated by the hydraulic pressure applied thereto. The magnitude of this force is determined by the gas pressure in the hydro-pneumatic cylinder 29, and by choosing a suitable gas pressure and a suitable inner diameter of the hydraulic cylinder 6 it is possible to completely balance the weight of the system to be raised. The power required for turning the crank is thus comparatively small. However, when making the necessary adjustment for height and at the beginning of the raising operation, before the barrel is clear of the bed, the total hydraulic pressure acts on the teeth of the worm wheel 8 and the rack 7, and there is therefore a very great frictional force to be overcome, and also in other cases, as when lowering the beam without the barrel, great power is required. In these cases it is preferable to mount the crank 11 on the upper shaft 15 whereby a more advantageous gear ratio is obtained. This position of the crank is also used for raising and lowering the beam when for some reason or other the balancing means are disconnected.

When the beam 18 is in a horizontal position the traveller 19 with the barrel 4 is moved over to the gun carriage. By means of the lifting means on the gun carriage the barrel is then lowered on to the gun carriage (position III in Figure 1).

The barrel is then disconnected from the traveller 19 and the beam is swung out of the way. The transfer of the barrel from the gun carriage to the transport carriage is effected in the reverse order, after the free end of the beam 18 has again been placed in the fork 17a; also in this case the connection of the barrel to the traveller 19 is quickly effected, as the shackle 20 since the previous transfer of the barrel to the gun carriage is at the correct height (the position of the lifting cylinder 6a remains unchanged).

Obviously the invention is not limited to the construction of the conveyer means shown and described. Thus, for instance, for the hydro-pneumatic lifting means may be substituted compression springs disposed for instance in the uprights 5 and 5a and serving to raise the cylinders 6 and 6a, or tension springs acting in a similar way. Also the other details of the construction may be modified without departing from the spirit of the invention.

What I claim as new and desire to secure by Letters Patent of the United States of America is:

1. In combination, a gun carriage and a transport carriage, hand-operable lifting means including a raisable and lowerable part on said gun carriage and on said transport carriage, a support on said raisable and lowerable part of each of said lifting means, a beam applicable between said supports, and a traveller movable on said beam for the transfer of the gun barrel from said gun carriage to said transport carriage and vice versa.

2. In combination, a gun carriage and a transport carriage, hand-operable lifting means including a raisable and lowerable part on said gun carriage and on said transport carriage, a support on said raisable and lowerable part of each of said lifting means, a beam applicable between said supports, a traveller movable on said beam for the transfer of the gun barrel from said gun carriage to said transport carriage and vice versa, and means on said gun carriage and on said transport carriage for balancing the weight of said barrel.

3. In combination, a gun carriage and a transport carriage, hand-operable lifting means including a raisable and lowerable part on said gun carriage and on said transport carriage, a support on said raisable and lowerable part of each of said lifting means, a beam applicable between said supports, a traveller movable on said beam for the transfer of the gun barrel from said gun carriage to said transport carriage and vice versa, and means on said gun carriage and on said transport carriage for balancing the weight of said barrel and also of the said raisable and lowerable parts including the beam.

4. In combination, a gun carriage and a transport carriage, hand-operable lifting means including a raisable and lowerable part on said gun carriage and on said transport carriage, a support on said raisable and lowerable part of each of said lifting means, a beam applicable between said supports, a traveller movable on said beam for the transfer of the gun barrel from said gun carriage to said transport carriage and vice versa, and means on said gun carriage and on said transport carriage for substantially balancing the parts to be raised and lowered including the barrel, said means comprising a hydro-pneumatic pressure container, the pressure in said container actuating said raisable and lowerable parts of the lifting means.

5. In combination, a gun carriage and a transport carriage, hand-operable lifting means including a raisable and lowerable part on said gun carriage and on said transport carriage, a support on said raisable and lowerable part of each of said lifting means, a beam applicable between said supports, a traveller movable on said beam for the transfer of the gun barrel from said gun carriage to said transport carriage and vice versa, and means on said gun carriage and on said transport carriage for substantially balancing the parts to be raised and lowered including the barrel, said means comprising a hydro-pneumatic pressure container, the pressure in said container actuating said raisable and lowerable parts of the lifting means, the pressure container on the gun carriage comprising the hydro-pneumatic barrel-return cylinder on said latter carriage.

6. In combination, a gun carriage and a transport carriage, a tubular upright firmly secured to each of said carriages, a cylinder movable in each of said uprights, a rack member on each of said cylinders, a worm wheel engaging each of said rack members, a bevel gearing in operative connection with each of said worm wheels, a crank for operating the driving wheel of each of said bevel gearings, a supporting member at the top of each of said movable cylinders, a beam applicable to said supporting members, and a traveller movable on said beam for the transfer of the gun barrel from said gun carriage to said transport carriage and vice versa.

7. In combination, a gun carriage, and a transport carriage, a tubular upright firmly secured to each of said carriages, a cylinder movable in each of said uprights, a rack member on each of said cylinders, a worm wheel engaging each of said rack members, a bevel gearing in operative connection with each of said worm wheels, a crank for operating the driving wheel of each of said bevel gearings, a supporting member at the top of each of said movable cylinders, a beam applicable to said supporting members, and a traveller movable on said beam for the transfer of the gun barrel from said gun carriage to said transport carriage and vice versa, the supporting member on the transport carriage being pivotally connected to the related movable cylinder and the beam being swingably connected to said supporting member.

8. In combination, a gun carriage and a transport carriage, a tubular upright firmly secured to each of said carriages, a cylinder movable in each of said uprights, a rack member on each of said cylinders, a worm wheel engaging each of said rack members, a bevel gearing in operative connection with each of said worm wheels, a crank for operating the driving wheel of each of said bevel gearings, a reduction gearing in operative connection with each of said bevel gearings and made to be operated by said crank, a supporting member at the top of each of said movable cylinders, a beam applicable to said supporting members, and a traveller movable on said beam for the transfer of the gun barrel from said gun carriage to said transport carriage and vice versa.

9. In combination, a gun carriage and a transport carriage, a tubular upright firmly secured to each of said carriages, a cylinder movable in each of said uprights, a rack member on each of said cylinders, a worm wheel engaging each of said rack members, a bevel gearing in operative connection with each of said worm wheels, a crank for operating the driving wheel of each of said bevel gearings, a reduction gearing in operative connection with each of said bevel gearings and made to be operated by said crank, a supporting member at the top of each of said movable cylinders, a beam applicable to said supporting members, and a traveller movable on said beam for the transfer of the gun barrel from said gun carriage to said transport carriage and vice versa, the supporting member on the transport carriage being pivotally connected to the related movable cylinder and the beam being swingably connected to said supporting member.

10. In combination, a gun carriage and a transport carriage, a tubular upright firmly secured to each of said carriages, a hollow cylinder closed at its top end movable in each of said uprights, a rack member on each of said cylinders, a worm wheel engaging each of said rack members, a bevel gearing in operative connection with each of said worm wheels, a crank for operating the driving wheel of each of said bevel gearings, a stationary piston in each of said cylinders, a chamber being formed in said cylinder above the upper end of said piston, a hydro-pneumatic pressure container on each of said carriages in communication with each of said chambers, a supporting member at the top of each of said movable cylinders, a beam applicable to said supporting members, and a traveller movable on said beam for the transfer of the gun barrel from said gun carriage to said transport carriage and vice versa.

11. In combination, a gun carriage and a transport carriage, a tubular upright firmly secured to each of said carriages, a hollow cylinder closed at its top end movable in each of said uprights, a rack member on each of said cylinders, a worm wheel engaging each of said rack members, a bevel gearing in operative connection with each of said worm wheels, a crank for operating the driving wheel of each of said bevel gearings, a reduction gearing in operative connection with each of said bevel gearings and made to be operated by said crank, a stationary piston in each of said cylinders, a chamber being formed in said cylinder above the upper end of said piston, a hydro-pneumatic pressure container on each of said carriages in communication with each of said chambers, a supporting member at the top of each of said movable cylinders, a beam applicable to said supporting members, and a traveller movable on said beam for the transfer of the gun barrel from said gun carriage to said transport carriage and vice versa.

12. In combination, a gun carriage and a transport carriage, a tubular upright firmly secured to each of said carriages, a hollow cylinder closed at its top end movable in each of said uprights, a rack member on each of said cylinders, a worm wheel engaging each of said rack members, a bevel gearing in operative connection with each of said worm wheels, a crank for operating the driving wheel of each of said bevel gearings, a reduction gearing in operative connection with each of said bevel gearings and made to be operated by said crank, a stationary piston in each of said cylinders, a chamber being formed in said cylinder above the upper end of said piston, a hydro-pneumatic pressure container on each of said carriages in communication with each of said chambers, a supporting member at the top of each of said movable cylinders, a beam applicable to said supporting members, and a traveller movable on said beam for the transfer of the gun barrel from said gun carriage to said transport carriage and vice versa, the supporting member on the transport carriage being pivotally connected to the related movable cylinder and the beam being swingably connected to said supporting member.

VICTOR HAMMAR.

CERTIFICATE OF CORRECTION.

Patent No. 2,239,558. January 18, 1944.

JAMES E. HALE.

It is hereby certified that error appears in the printed specification of the above numbered patent requiring correction as follows: Page 1, first column, line 30, strike out the syllable "ding" and insert instead --provide a tire having superior resistance to skidding--; and that the said Letters Patent should be read with this correction therein that the same may conform to the record of the case in the Patent Office.

Signed and sealed this 25th day of April, A. D. 1944.

Leslie Frazer

(Seal) Acting Commissioner of Patents.